US012717653B2

(12) United States Patent
Li et al.

(10) Patent No.: US 12,717,653 B2
(45) Date of Patent: Aug. 25, 2026

(54) METHOD FOR PROCESSING TASK, PROCESSOR, DEVICE AND READABLE STORAGE MEDIUM

(71) Applicant: Kunlunxin Technology (Beijing) Company Limited, Beijing (CN)

(72) Inventors: Haoyang Li, Beijing (CN); Yupeng Li, Beijing (CN); Jing Wang, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 824 days.

(21) Appl. No.: 17/812,004

(22) Filed: Jul. 12, 2022

(65) Prior Publication Data

US 2022/0342712 A1 Oct. 27, 2022

(30) Foreign Application Priority Data

Jul. 20, 2021 (CN) ........................ 202110821443.7

(51) Int. Cl.
*G06F 9/50* (2006.01)
*G06F 9/52* (2006.01)

(52) U.S. Cl.
CPC ............ *G06F 9/522* (2013.01); *G06F 9/5066* (2013.01); *G06F 2209/5017* (2013.01); *G06F 2209/509* (2013.01)

(58) Field of Classification Search
CPC .................. G06F 9/522; G06F 9/5066; G06F 2209/5017; G06F 2209/509
USPC ................................ 718/102, 103, 104, 106
See application file for complete search history.

(56) References Cited

U.S. PATENT DOCUMENTS

2011/0004882 A1* 1/2011 Vengerov .............. G06F 9/5033 718/103
2017/0109214 A1* 4/2017 Raman .................. G06F 9/4881
2018/0074727 A1* 3/2018 Zhao ....................... G06F 9/544
2021/0073170 A1* 3/2021 Liao .................... G06F 15/7807

FOREIGN PATENT DOCUMENTS

CN 102073543 A 5/2011
CN 104794100 A 7/2015
CN 107122162 A 9/2017
CN 112418389 A 2/2021

* cited by examiner

*Primary Examiner* — April Y Blair
*Assistant Examiner* — Justin Che-Chun Tong
(74) *Attorney, Agent, or Firm* — Knobbe, Martens, Olson & Bear, LLP

(57) ABSTRACT

The present disclosure provides a method for processing a task, a processor, a device and a readable storage medium, and the method comprises: for a predetermined type of computing task, allocating a plurality of instruction blocks in the computing task to a general-purpose processing core and a dedicated acceleration core; transferring, by a control unit in the dedicated acceleration core, an instruction completion indication of a predetermined co-processing unit coupled thereto to at least one processing unit of the general-purpose processing core through a signal path, the signal path being configured to couple the at least one general-purpose processing unit to the control unit; and if it is determined that the instruction completion indication is received, acquiring, by the general-purpose processing core, data from a first on-chip cache in the dedicated acceleration core through a data path for completing the computing task.

19 Claims, 4 Drawing Sheets

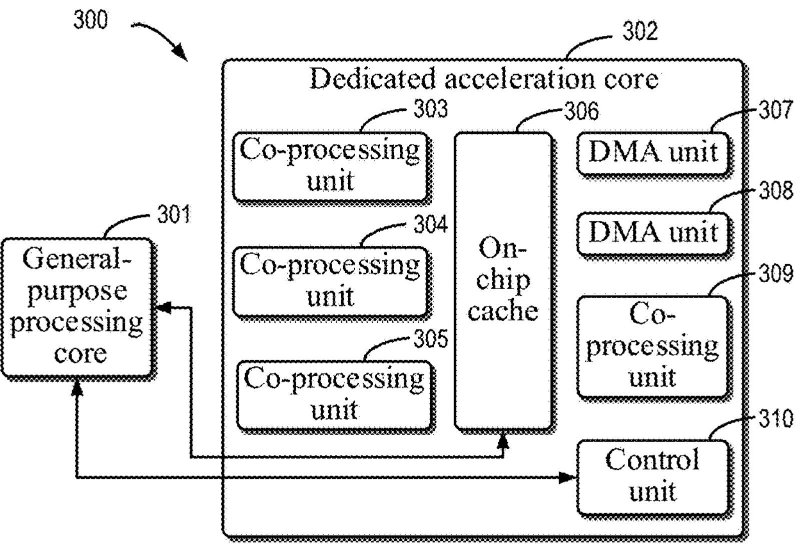

Fig. 3

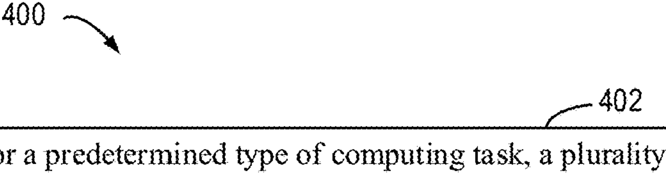

For a predetermined type of computing task, a plurality of instruction blocks in the computing task being allocated to the general-purpose processing core and the dedicated acceleration core

404

A control unit in the dedicated acceleration core transfering an instruction completion indication of a predetermined co-processing unit coupled thereto to at least one processing unit of the general-purpose processing core through a signal path, the signal path being configured to couple the at least one general-purpose processing unit to the control unit

406

If it is determined that the instruction completion indication is received, the general-purpose processing core acquiring data from a first on-chip cache in the dedicated acceleration core through a data path for completing the computing task, the data path being configured to couple the general-purpose processing core to the first on-chip cache

Fig. 4

METHOD FOR PROCESSING TASK, PROCESSOR, DEVICE AND READABLE STORAGE MEDIUM

CROSS-REFERENCE TO RELATED APPLICATIONS

This application claims priority to Chinese Patent Application No. 202110821443.7, filed with the China National Intellectual Property Administration (CNIPA) on Jul. 20, 2021, the contents of which are incorporated herein by reference in their entirety.

TECHNICAL FIELD

The present disclosure relates to the technical field of computers, and in particular, to a method for processing a task, a processor, a device and a readable storage medium in the fields of chips and deep learning.

BACKGROUND

Artificial Intelligence (AI) algorithms have been widely used in many important Internet applications, such as speech recognition, image recognition, and natural language processing. Compared with traditional methods, the AI algorithms can often achieve better accuracy and effects. A deep neural network is one of the most widely used AI algorithms. When this algorithm is used, large-scale multiplication and addition computes are required for mass data, so it is a typical compute-intensive application. In light of its large data compute amount, it is a common practice to use hardware accelerators such as GPU, FPGA, and NPU for acceleration.

In the past two decades, due to the constraints of semiconductor technology, heat dissipation, etc., it has been difficult to improve the performance of processors simply by increasing the main frequency. Most processors have turned to multi-core technology to improve their computing performance. The so-called multi-core technology is to integrate multiple identical or different processor cores inside a processor. When tasks are processed, the computing tasks are distributed to the multiple processor cores by scheduling to complete together. The computing performance of the entire processor is improved by the parallel computing of the processor cores. There are still many problems that need to be solved in the process of using multi-core processors to process AI algorithms.

SUMMARY

Some embodiments of the present disclosure provides a method for processing a task, a processor, a device and a readable storage medium.

In a first aspect, embodiments of the present disclosure provide a method for processing a computing task by a heterogeneous multi-core processor, the heterogeneous multi-core processor comprising a general-purpose processing core and a dedicated acceleration core, the method comprising: for a predetermined type of computing task, allocating a plurality of instruction blocks in the computing task to the general-purpose processing core and the dedicated acceleration core; transferring, by a control unit in the dedicated acceleration core, an instruction completion indication of a predetermined co-processing unit coupled thereto to at least one processing unit of the general-purpose processing core through a signal path, the signal path being configured to couple the at least one general-purpose processing unit to the control unit; and if it is determined that the instruction completion indication is received, acquiring, by the general-purpose processing core, data from a first on-chip cache in the dedicated acceleration core through a data path for completing the computing task, the data path being configured to couple the general-purpose processing core to the first on-chip cache.

In a second aspect, embodiments of the present disclosure provide an apparatus for a heterogeneous multi-core processor, comprising: a dedicated acceleration core, comprising a first on-chip cache and a control unit coupled to the first on-chip cache; a general-purpose processing core, comprising a routing structure component and at least one general-purpose processing unit coupled to the routing structure component; a data path, configured to couple the routing structure component to the first on-chip cache so that the at least one general-purpose processing unit can access the first on-chip cache; and a signal path, configured to couple the at least one general-purpose processing unit to the control unit for transferring an instruction completion indication related to the access.

In a third aspect, embodiments of the present disclosure provide an electronic device, comprising: at least one heterogeneous multi-core processor provided by the second aspect; and a memory connected to the at least one heterogeneous multi-core processor by communication, wherein the memory stores instructions executable by the at least one processor, the instructions being executed by the at least one heterogeneous multi-core processor, so that the at least one heterogeneous multi-core processor can perform the method provided by the first aspect.

In a fourth aspect, embodiments of the present disclosure provide a computer-readable medium, storing a computer program thereon, wherein the program, when executed by a processor, causes the processor to implement the method provided by the first aspect.

In a fifth aspect, an embodiment of the present disclosure provides a computer program product, comprising a computer program, wherein the computer program, when executed by a processor, implements the method provided by the first aspect.

It should be appreciated that the description of the summary is not intended to limit the key or important features of the embodiments of the present disclosure, or to limit the scope of the present disclosure. Other features of the present disclosure will become readily comprehensible through the following description.

BRIEF DESCRIPTION OF THE DRAWINGS

The accompanying drawings are used for better understanding of this solution, and do not constitute limitations to the present disclosure.

FIG. 3 shows a schematic diagram of an example 300 of a general-purpose processing core and a dedicated acceleration core from the perspective of the dedicated acceleration core according to some embodiments of the present disclosure;

FIG. 4 shows a flowchart of a method 400 for processing a task according to some embodiments of the present disclosure.

DETAILED DESCRIPTION OF EMBODIMENTS

Figure 1:
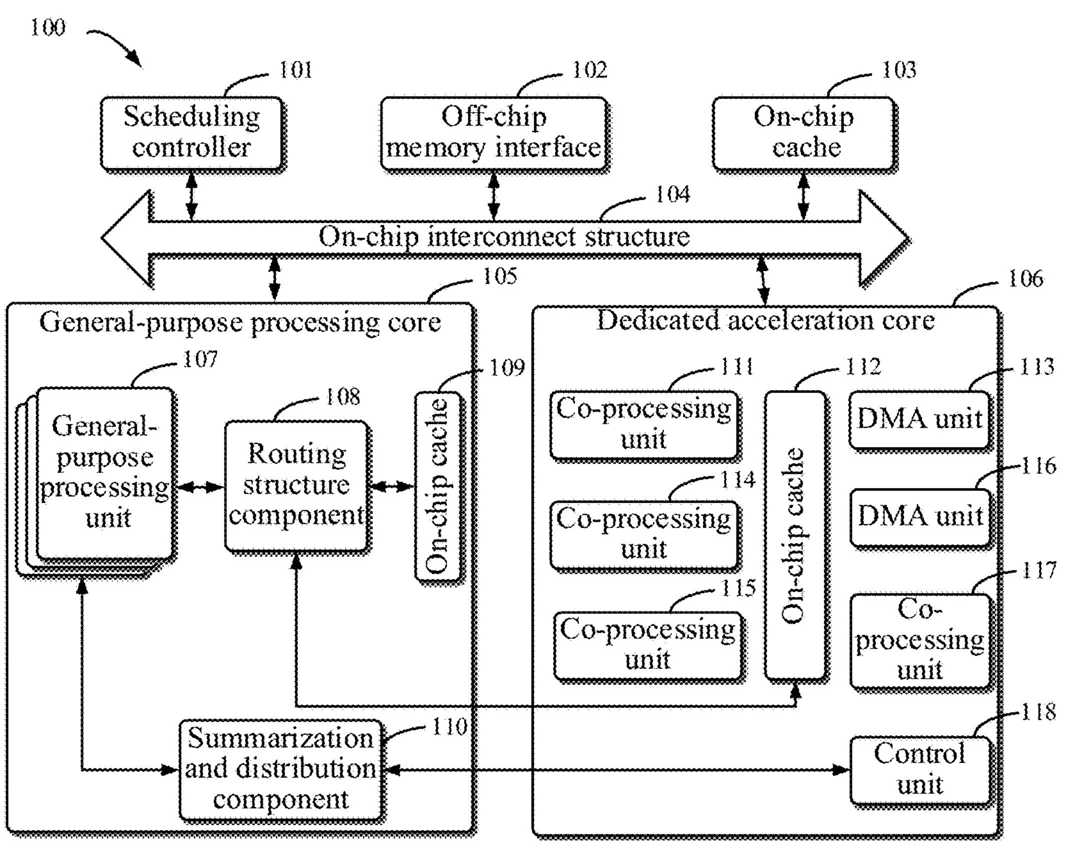
FIG. 1 shows a schematic diagram of a heterogeneous multi-core processor 100 in which multiple embodiments of the present disclosure can be implemented.

Exemplary embodiments of the present disclosure are described below with reference to the accompanying drawings, including various details of the embodiments of the present disclosure to facilitate understanding. The embodiments should be considered as exemplary only. Accordingly, those of ordinary skill in the art should recognize that various changes and modifications can be made to the embodiments described herein without departing from the scope and spirit of the present disclosure. Also, descriptions of well-known functions and constructions are omitted from the following description for clarity and conciseness.

In the description of the embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The terms "first", "second" and the like may indicate different or identical objects. Other explicit and implicit definitions may also be included below.

Hardware accelerators can be divided into homogeneous multi-core processors and heterogeneous multi-core processors based on the types of computing resources. Multiple identical processing cores are integrated in a homogeneous multi-core processor, and all the cores can undertake the same computing task. Multiple kinds of processing cores with different structures are integrated in a heterogeneous multi-core processor, and each core is suitable for processing different computing tasks.

At present, with the rapid development of AI technology and rapid iteration of algorithms, neural network accelerators need not only high computing efficiency, but also strong flexibility to be compatible with future network structure computations.

A heterogeneous multi-core neural network accelerator integrates a dedicated acceleration core and a general-purpose processing core at the same time. A large number of processing units such as a multiplier and an adder are integrated in the dedicated acceleration core, and a dedicated computing pipeline are arranged therein, which can efficiently complete the computations of typical basic AI neural network structures, such as convolution, matrix multiplication, and vector computation. The general-purpose processing core is easy to program and flexible to use, can realize various computing functions, and can adapt to continuous update of AI algorithms. In computing, the neural network accelerator uses the dedicated acceleration core to process typical high computational density operators such as convolution and matrix multiplication to achieve relatively high processing performance, and uses the general-purpose processing core to process operators that cannot be processed by dedicated accelerators, to avoid decrease in processing performance due to bandwidth bottlenecks when the operators that cannot be accelerated need to be transmitted back to a host.

In actual computing, the neural network accelerator distributes different computing tasks to each processing core based on the characteristics of the computing tasks and the structures of the integrated processing cores, to complete the computing in turn. However, due to the constraints of data dependencies, computations can often only be performed serially on the neural network accelerator, making it difficult to fully use the computing power of the neural network accelerator; meanwhile, when the processing cores that perform computations are switched, the overhead of data migration and the corresponding switching delay will be caused.

In the existing heterogeneous multi-core neural network accelerators, generally the scheduling controller selects the time for transmitting computing tasks to the processing cores, to complete the synchronization between processing cores. This method will cause fixed overhead when switching sub-computing tasks, thereby affecting the overall performance of the multi-core neural network accelerators. For example, the scheduling controller receives two dependent sub-computing tasks, respectively a first sub-computing task and a second sub-computing task. In order to improve the computing throughput, pipeline computing is used inside the processing cores for data processing. In this mode, the computing process can be divided into three stages: pipeline entrance, pipeline processing and pipeline exit. Only in the pipeline processing stage, all computing resources of the computing cores are in a working state to achieve the highest computing throughput. When the sub-computing tasks are switched, due to the introduction of synchronization of the scheduling controller, the pipeline is interrupted, so that idle computing resources occur between the first sub-computing task and the second sub-computing task. Because this part of time is substantially fixed, as the computing power of the neural network accelerator increases, the total computing time decreases, and the proportion of this part of fixed overhead in the entire computing task will become more and more obvious.

Another problem of this mode is that the overall memory access bandwidth has a large impact on computing performance. The clock frequency and performance of contemporary processors increase at an unimaginable rate, but the increase in memory access speed is much slower. Although cache and prefetch can help reduce the average memory access time, they still cannot fundamentally solve the problems, so the gap between processors and memories is growing. In a heterogeneous multi-core architecture, each processing core is generally integrated with its own on-chip memory, which can efficiently access internal data, but data exchange between processing cores generally needs to be completed by a unified off-chip memory or on-chip cache. Therefore, the data exchange between sub-computing tasks often needs to go through a unified on-chip interconnect structure, on-chip cache or off-chip memory. However, due to limited bandwidth and large delay, considering that neural network computing tasks often have large data volumes, data access often becomes a system bottleneck, to affect the overall computing performance.

This mode has another problem that it is difficult to reuse the computing and memory resources between different processing cores. It is difficult for different processing cores to work at the same time due to the constraints of data dependence in computing tasks. Even if the impact of data dependence is reduced by multi-threading, because different processing cores spend different time in the computing tasks, some processing cores are still idle even if the task pipeline is arranged carefully, causing the waste of computing resources.

In order to at least solve the above problems, according to an embodiment of the present disclosure, an improved solution for processing a computing task by a heterogeneous multi-core processor is proposed. In this solution, for a predetermined type of computing task, a plurality of instruction blocks in the computing task are allocated to a general-purpose processing core and a dedicated acceleration core. A control unit in the dedicated acceleration core then transmits an instruction completion indication of a predetermined co-processing unit coupled there to at least one processing unit of the general-purpose processing core through a signal path. If the general-purpose processing core receives the instruction completion indication, the general-purpose processing core acquires data from a first on-chip cache in the dedicated acceleration core through a data path to complete the computing task. This method avoids the overhead of computing task switching, reduces the dependence on network bandwidth and memory bandwidth, improves the utilization rate of memory resources and computing resources, and uses the computing performance of the accelerator to the greatest extent.

In some embodiments of the present disclosure, the term “general-purpose processing core” refers to a processing core that is not designed for specific computing tasks but can complete various computing tasks, is generally designed with a CPU-like architecture and has strong flexibility. The term “dedicated acceleration core” refers to a special processing core specially optimized for specific tasks, which can efficiently process various corresponding computing tasks, but cannot complete other types of computing tasks. The dedicated acceleration core integrates a direct memory access (DMA) unit and a variety of co-processing units, which can respectively complete data access and various specially optimized computing tasks. Respective execution orders are maintained between the co-processing units through an asynchronous cooperation instruction, so that each computing step is completed in a pipeline manner in the computation. Data transfer is completed between the co-processing units inside the dedicated acceleration core through their internal on-chip caches.

FIG. 1 shows a schematic diagram of a heterogeneous multi-core processor 100 in which multiple embodiments of the present disclosure can be implemented. The processor 100 includes a scheduling controller 101, a general-purpose processing core 105, a dedicated acceleration core 106, and an on-chip cache 103, and the components communicate through an on-chip interconnect structure 104. The processor 100 further includes an off-chip memory interface 102 to connect with an off-chip memory. The off-chip memory may be various suitable memories or memory modules packaged with the processor 100 for the processor 100 to exchange data with external apparatuses.

The scheduling controller 101 in the processor 100 is configured to control the processing of computing tasks in the processor 100 and allocate the computing tasks to the general-purpose processing core 105 and the dedicated acceleration core. When a computing task is executed, the scheduling controller obtains the computing task to be processed. If it is determined that the type of the computing task is a predetermined type, such as a co-processing task type, the scheduling controller obtains a core group including an available dedicated acceleration core and an available general-purpose processing core from the processor 100. The scheduling controller then configures the working mode of the cores in the core group as a predetermined mode, such as a cooperative mode, so that the core group cooperatively processes the computing task. In this way, different computing tasks can be processed cooperatively, the time for processing tasks is reduced, and memory resources and computing resources are saved.

A plurality of instruction blocks of the computing task are allocated to the available dedicated acceleration core and the available general-purpose processing core for processing the computing task.

The on-chip cache 103 is configured to store data accessed by the general-purpose processing core 105 and the dedicated acceleration core 106. The on-chip cache 103 can accelerate the processing of data in the processor 100, especially the processing of data between cores.

The general-purpose processing core 105 includes at least one general-purpose processing unit 107, a routing structure component 108 and an on-chip cache 109. The at least one general-purpose processing unit 107 is coupled to the routing structure component 108. The routing structure component 108 is coupled to the on-chip cache 109.

In order to realize the access of the general-purpose processing core 105 to an on-chip cache 112 in the dedicated acceleration core 106, a data path is configured between the routing structure component 108 and the on-chip cache 112. In some embodiments, the data path is configured as an AXI bus. In some embodiments, the data bus is configured as an APB bus. In some embodiments, a custom bus structure can be configured as required. The above example is only used to describe the present disclosure, but does not specifically limit the present disclosure.

After the data path is configured, the routing structure component 108 is also coupled to the on-chip cache 112, and determines whether to access the on-chip cache 109 or the on-chip cache 112 based on a storage address in an access instruction received from the general-purpose processing unit 107. For the convenience of description, the on-chip cache 112 is referred to as a first on-chip cache, and the on-chip cache 109 is referred to as a second on-chip cache. In this way, caches on different cores can be accessed according to needs, which accelerates the processing of data.

A summarization and distribution component 110 is also provided in the general-purpose processing core 105. The summarization and distribution component 110 connects various processing units within the general-purpose processing core. The summarization and distribution component is also connected to a control unit in the dedicated acceleration core 106 by a signal path for sending an instruction completion indication to a co-processing unit in the dedicated acceleration core or receiving an instruction completion indication of a predetermined co-processing unit from the control unit. In this way, the transfer of instructions between two processing cores can be accelerated. In some embodiments, the signal path is an AXI bus. In some embodiments, the signal path is a communication line configured by a user, such as a communication line including a valid bit line and an eight-bit digit line. The above example is only used to describe the present disclosure, but does not specifically limit the present disclosure.

During working, when other co-processing units send instruction completion indications through the signal path, the summarization and distribution component 110 copies the indications multiple times and distributes the same to all general-purpose processing units of the general-purpose processing core 105; and when the general-purpose processing unit generates instruction completion indications, the summarization and distribution component 110 collects the instruction completion indications from each processing unit and sends the same to the control unit 118 after summarizing, and then the control unit 118 sends the instruction completion indications to the corresponding co-processing units.

In order to realize the above operation, an asynchronous cooperative instruction is added to the general-purpose processing core 105 in some embodiments of the disclosure. The asynchronous cooperative instruction includes two instructions, respectively a wait instruction and a completion instruction. The wait instruction includes two main fields, where field 1 is used to indicate that the type of an instruction is the wait instruction, and field 2 is used to indicate which co-processing units the waited completion signals described in the instruction come from; and when executing the instruction, the general-purpose processing core needs to wait for the plurality of co-processing units indicated in the instruction to send completion signals before continuing to perform subsequent work. The completion instruction includes two main fields, where field 1 is used to indicate that the type of an instruction is the completion instruction, and field 2 is used to indicate to which co-processing units a completion signal needs to be sent. When executing the instruction, the general-purpose processing core needs to send the completion signal to each co-processing unit indicated in the instruction. Through the above instructions, tasks can be cooperatively processed between cores of different structures.

In FIG. 1, the dedicated acceleration core includes four co-processing units 111, 114, 115 and 117 and two DMA units 113 and 116. It is merely an example, and not a specific limitation of the present disclosure. The dedicated acceleration core may include any suitable number of co-processing units and any number of DMA units, for example, at least one co-processing unit and at least one DMA unit. In this way, the processing core can meet different requirements.

The control unit 118 in the dedicated acceleration core 106 is configured to allocate instruction blocks for the computing task to the co-processing units, and can send the completion instruction indications of the co-processing units to the summarization and distribution component, and send an instruction completion indication received from the summarization and distribution component to a predetermined co-processing unit to achieve co-processing of the task. The dedicated acceleration core is thus configured to, if it is determined that the execution of the instruction blocks in the co-processing unit is completed, send an instruction completion indication to the general-purpose processing core; and to receive an instruction completion indication from the general-purpose processing core, the instruction completion indication including to which co-processing cores in the dedicated acceleration core the instruction completion indication is sent. In this way, the cooperative processing of the task can be achieved.

The on-chip cache 112 is connected to the routing structure component by the data path, and an access interface is added to the on-chip cache 112 in the dedicated acceleration core 106 to form the data path. This interface is exposed to the general-purpose processing core 105 to connect the added access path.

In order to realize the signal path between the control unit 118 of the dedicated acceleration core and the summarization and distribution component 110, a co-processing unit arbitration interface is added at the control unit 118. The interface is connected to the general-purpose processing core or the summarization and distribution module therein, and the scheduling module can receive and send completion signals to the general-purpose processing core through the interface, thereby controlling the order of execution of instructions.

FIG. 1 shows that the at least one general-purpose processing unit 107 is connected to the summarization and distribution component 110, which is by way of example only. In some embodiments, when the at least one general-purpose processing unit 107 is a general-purpose processing unit, the general-purpose processing core 105 may not be provided with the summarization and distribution component.

FIG. 1 shows a general-purpose processing core 105 and a dedicated acceleration core 106, which are only examples, and not specific limitations of the present disclosure. The processor 100 may include any suitable number of general-purpose processing cores and dedicated acceleration cores.

A data access path for accessing the on-chip memory of the dedicated acceleration core is added to the general-purpose processing core. This path exposes the storage space inside the dedicated acceleration core to the general-purpose processing core, thereby allowing the general-purpose processing core to implement data access in the form of a special instruction or address space.

An asynchronous cooperative instruction is added to the general-purpose processing core. The asynchronous cooperative instruction includes two instructions, respectively a wait instruction and a completion instruction. The wait instruction includes two main fields, where field 1 is used to indicate that the type of an instruction is the wait instruction, and field 2 is used to indicate which co-processing units the waited completion signals described in the instruction come from; and when executing the instruction, the general-purpose processing core needs to wait for the plurality of co-processing units indicated in the instruction to send completion signals before continuing to perform subsequent work. The completion instruction includes two main fields, where field 1 is used to indicate that the type of an instruction is the completion instruction, and field 2 is used to indicate to which co-processing units a completion signal needs to be sent; and when executing the instruction, the processing core needs to send the completion signal to each co-processing unit indicated in the instruction.

If the general-purpose processing core itself is of a multi-core structure, a summarization and distribution module is added. The summarization and distribution module is connected to each processing core inside the general-purpose processing core and also connected to other co-processing units. During working, when other co-processing units send completion signals, the summarization and distribution module copies the signals multiple times and distributes the same to all processing cores of the general-purpose processing core; and when the general-purpose processing core sends a completion signal, the summarization and distribution module collects the completion signals from each processing core and sends the same to the corresponding co-processing units after summarizing.

An access interface is added to the on-chip cache in the dedicated acceleration core. This interface is exposed to the general-purpose processing core to connect the added access path.

A co-processing unit arbitration interface is added to a scheduling unit of the dedicated acceleration core. The interface is connected to the general-purpose processing core or the summarization and distribution module therein, and the scheduling module can receive and send completion signals to the general-purpose processing core through the interface, thereby controlling the order of execution of instructions.

This method avoids the overhead of computing task switching, reduces the dependence on network bandwidth and memory bandwidth, improves the utilization rate of memory resources and computing resources, and uses the computing performance of the accelerator to the greatest extent.

Figure 2:
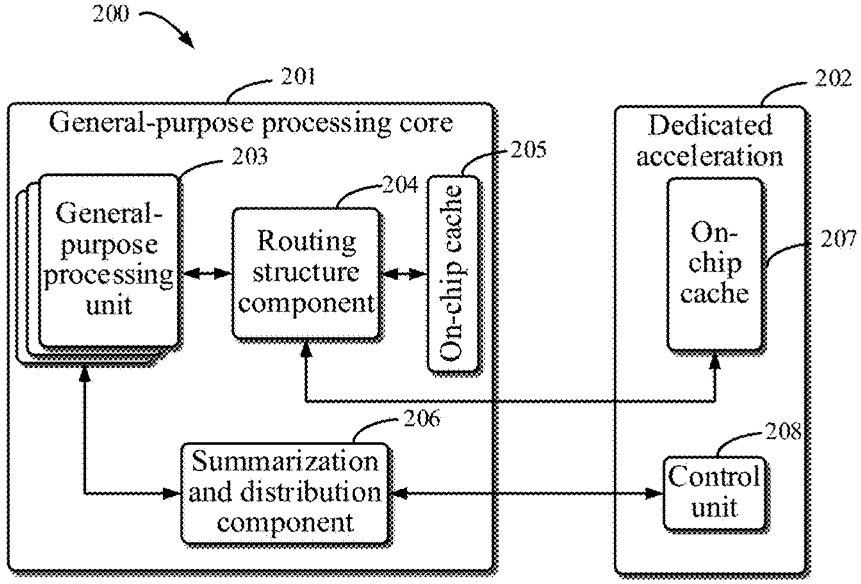
FIG. 2 shows a schematic diagram of an example 200 of a general-purpose processing core and a dedicated acceleration core from the perspective of the general-purpose processing core according to some embodiments of the present disclosure.

The schematic diagram of the heterogeneous multi-core processor 100 in which multiple embodiments of the present disclosure can be implemented is described above in conjunction with FIG. 1. Examples from a general-purpose processing core perspective and a dedicated acceleration core perspective are described below in conjunction with FIGS. 2 and 3. FIG. 2 depicts a schematic diagram of an example 200 of a dedicated acceleration core and an acceleration processing core from the perspective of a general-purpose processing core according to some embodiments of the present disclosure; and FIG. 3 depicts a schematic diagram of an example 300 of a dedicated acceleration core and an acceleration processing core from the perspective of the dedicated acceleration core according to some embodiments of the present disclosure.

FIG. 2 includes a general-purpose processing core 201 and a dedicated acceleration core 202 coupled to each other. The general-purpose processing core includes at least one general-purpose processing unit 203, a routing structure component 204, an on-chip cache 205 and a summarization and distribution component 206. The dedicated acceleration core 202 includes an on-chip cache 207 and a control unit 208. The functions of the above-mentioned components are the same as those of the corresponding components in FIG. 1.

From the perspective of the general-purpose processing core, a storage space is added to the general-purpose processing core 201, and the access performance of this space is lower than that of the on-chip cache 205 therein, but higher than that of an off-chip memory and the on-chip cache of the heterogeneous multi-core processor. When a program is written, if source data comes from the dedicated acceleration core 202, a wait instruction is first added to instruct the general-purpose processing core 201 to start working after the work of a specified co-processing unit is completed; if the computation result is used by the co-processing unit of the dedicated acceleration core, a completion instruction is added after the computation instruction to instruct the corresponding co-processing unit to start working.

In FIG. 3, the dedicated acceleration core 302 includes four co-processing units 303, 304, 305 and 309, a control unit 310 and two DMA units. From the perspective of the dedicated acceleration core, the whole general-purpose processing core is used as a co-processing unit of the dedicated acceleration core. Resources inside the general-purpose processing core are not independently controlled by a scheduling module of the dedicated acceleration core, and data is exchanged between the general-purpose processing core 301 and other co-processing units through an on-chip cache inside the dedicated acceleration core 302.

This method avoids the overhead of computing task switching, reduces the dependence on network bandwidth and memory bandwidth, improves the utilization rate of memory resources and computing resources, and uses the computing performance of the accelerator to the greatest extent.

The dedicated acceleration core and general-purpose processing core from different perspectives are described above in conjunction with FIGS. 2 and 3. A flowchart of a method 400 for a task according to some embodiments of the present disclosure is described below in conjunction with FIG. 4. The method 400 in FIG. 4 may be performed by the processor 100 in FIG. 1 or any suitable processor.

The method in FIG. 4 is performed by a heterogeneous multi-core processor, and the heterogeneous multi-core processor includes a general-purpose processing core and a dedicated acceleration core.

At block 402, for a predetermined type of computing task, a plurality of instruction blocks in the computing task are allocated to the general-purpose processing core and the dedicated acceleration core. For example, the task is allocated to the general-purpose processing core 105 and the dedicated acceleration core 106.

In some embodiments, when a scheduling controller in processing cores receives the computing task, the scheduling controller will determine whether the computing task is a cooperative type of computing task. If the computing task is a cooperative type of computing task, a general-purpose processing core and a dedicated acceleration core that can be formed into a group are found in the general-purpose processing cores or dedicated acceleration cores within the processing cores to perform the computing task. The group of cores is identified as a predetermined working mode, such as a cooperative working mode. The above example is only used to describe the present disclosure, but does not specifically limit the present disclosure.

In some embodiments, the plurality of instruction blocks are allocated to the general-purpose processing core and the dedicated acceleration core based on core identifiers. In this way, instructions can be allocated to the processing cores quickly and accurately.

At block 404, a control unit in the dedicated acceleration core transfers an instruction completion indication of a predetermined co-processing unit coupled thereto to at least one processing unit of the general-purpose processing core through a signal path, the signal path being configured to couple the at least one general-purpose processing unit to the control unit.

In some embodiments, a summarization and distribution component in the general-purpose processing core copies the instruction completion indication and then sends the same to the at least one general-purpose processing unit. In this way, each processing unit can obtain the instruction completion indication.

In some embodiments, if the at least one general-purpose processing unit is a general-purpose processing unit, the general-purpose processing unit can be directly coupled to the control unit by means of the signal path. The above example is only used to describe the present disclosure, but does not specifically limit the present disclosure.

At block 406, if it is determined that the instruction completion indication is received, the general-purpose processing core acquires data from a first on-chip cache in the dedicated acceleration core through a data path for completing the computing task, the data path being configured to couple the general-purpose processing core to the first on-chip cache.

In some embodiments, the general-purpose processing unit sends an access address for the data to a routing structure component in the general-purpose processing core. The routing structure component then determines to access a second on-chip cache in the general-purpose processing core or the first on-chip cache based on the access address.

If it is determined to access the first on-chip cache based on the address information, the data is acquired from the access address in the first cache. In this way, the first on-chip cache can be accurately accessed.

In some embodiments, in response to that the at least one general-purpose processing unit completes an instruction block operation, an instruction completion indication is sent to the summarization and distribution component. The instruction completion indications are summarized by the summary distribution component and sent to the predetermined co-processing unit. In this way, the correct transfer of instructions can be achieved.

This method avoids the overhead of computing task switching, reduces the dependence on network bandwidth and memory bandwidth, improves the utilization rate of memory resources and computing resources, and uses the computing performance of the accelerator to the greatest extent.

Figure 5:
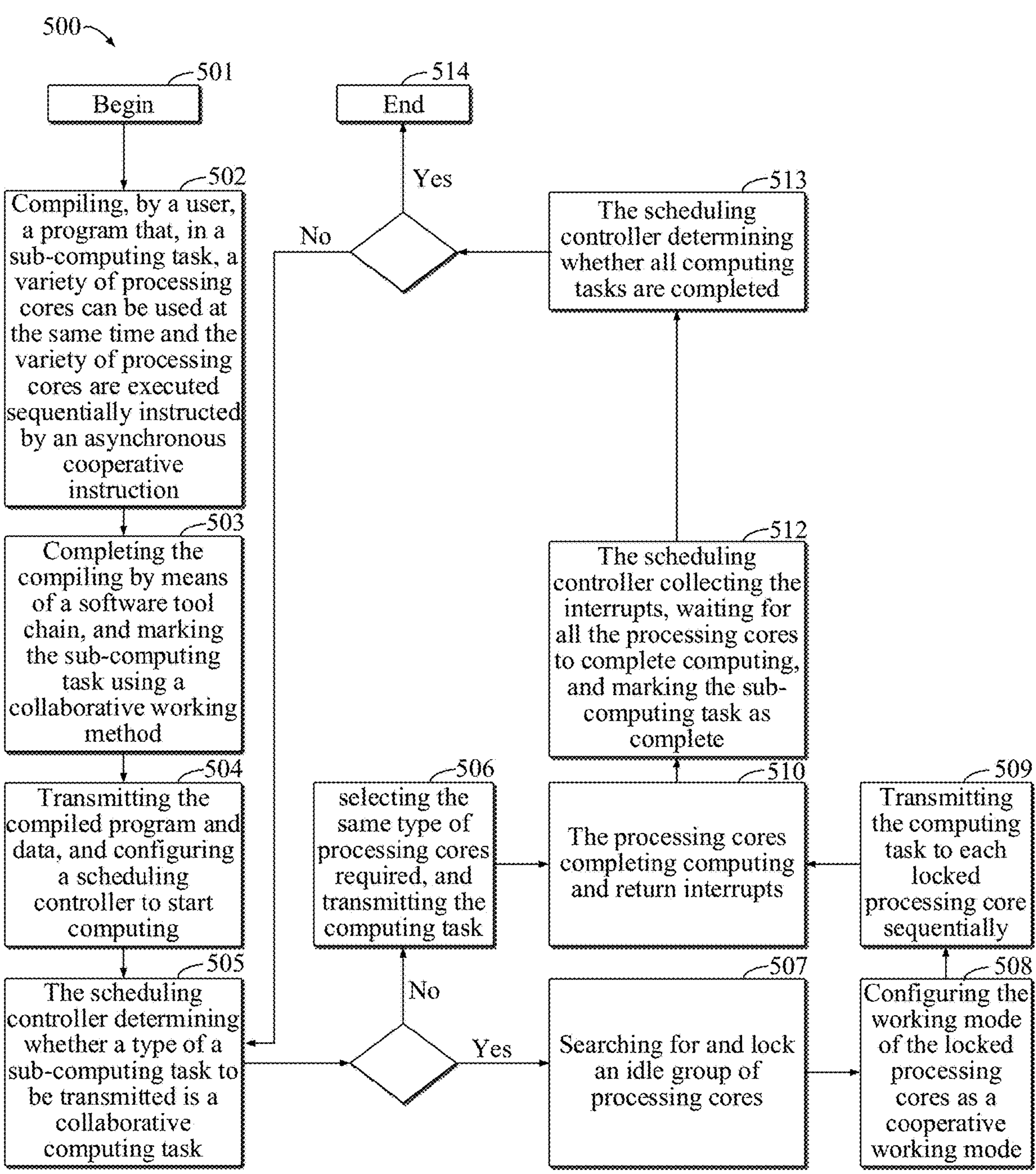
FIG. 5 shows a flowchart of a method 500 for processing a task according to some embodiments of the present disclosure.

A flowchart of a method 400 for a task according to some embodiments of the present disclosure is described above in conjunction with FIG. 4. A flowchart of a method 500 for a task according to some embodiments of the present disclosure is described below in conjunction with FIG. 5. The method 500 in FIG. 5 may be performed by a computing device including the processor 100 in FIG. 1 or by any suitable computing device.

At block 501, the method 500 begins. At block 502, a user compiles a program that, in a sub-computing task, a variety of processing cores can be used at the same time and their order of execution is instructed by an asynchronous cooperative instruction. In the traditional mode, only one processing core can be used for each sub-computing task. In the cooperative working mode, a variety of processing cores can be used at the same time in a sub-computing task, and the working order of the different processing cores is instructed by the asynchronous cooperative instruction.

At block 503, the compiling is completed by means of a software tool chain, and the sub-computing task using a collaborative working method is marked. For the sub-computing tasks that use a variety of processing cores, the compiled instructions are marked as co-mode computing tasks. At block 504, the compiled program and data are transmitted to a heterogeneous multi-core neural network accelerator by a driver and runtime program, and a scheduling controller is configured to start computing. At block 505, the scheduling controller determines based on the mark whether the type of the sub-computing task to be transmitted is a collaborative computing task, if no, block 506 is entered, otherwise, block 507 is entered.

At block 506, the scheduling controller selects the same type of processing cores required, and transmits the computing task. At block 507, the scheduling controller searches for and locks an idle group of processing cores. At block 508, the working mode of the locked processing cores is configured as a cooperative working mode. Next, block 509 is entered: the computing task is sequentially transmitted to each locked processing core. Next, block 510 is performed, the processing cores distinguish, based on the mark, instructions that they need to execute, and return interrupts to the scheduling controller after completing the computing task.

Then, at block 512, the scheduling controller collects the interrupts, and marks the sub-computing task as complete when all the processing cores called by the sub-computing task complete computing. In block 513, the scheduling controller determines whether all computing tasks are completed, that is, determines whether there are uncompleted computing tasks, and if no, block 505 is entered. If yes, at block 514, the scheduling controller returns the interrupt to a host to complete computing.

This method avoids the overhead of computing task switching, reduces the dependence on network bandwidth and memory bandwidth, improves the utilization rate of memory resources and computing resources, and uses the computing performance of the accelerator to the greatest extent.

An example of cloud computing task processing using a general-purpose processing core and a dedicated acceleration core is described below in conjunction with apiece of exemplary pseudo code. wait_core is a wait instruction, signal_core is a completion instruction, and xx_run is a computing program executed on corresponding co-processing units. This code constructs a computing pipeline DMA0→COP0→COP1→GENERAL_CORE→COP2→DMA1. DMA0 and DMA1 are direct memory access units in the dedicated acceleration core, COP0, COP1, and COP2 are co-processing units in the dedicated acceleration core, and GENERAL_CORE is a general-purpose processing core.

```
 for (int i = 0; i < super_step_num; i++) {
  // control the operation of DMA0
  if (core_id == CORE_DMA0) {
   wait_core(CORE_DMA1);// wait for a completion
instruction indication of DMA1 of last operation in the loop
operation
   dma0_run( ) ;// run the program allocated on DMA0
   signal_core(CORE_COP0) ;// send a signal to COP0
  }
 // control the operation of COP0
  if (core_id == CORE_COP0) {
   wait_core(CORE_DMA0);
   cop0_run( );
   signal_core(CORE_COP1);
  }
 // control the operation of COP1
  if (core_id == CORE_COP1) {
   wait_core(CORE_COP0);
   cop1_run( );
   signal_core(CORE_GENERAL);
  }
 // control the operation of GENERAL_CORE
  if (IS_GENERAL_CORE) {
   wait_core(CORE_COP1);
   cores_run( );
```

-continued

```
  signal_core(CORE_COP2);
 }
// control the operation of COP2
 if (core_id == CORE_COP2) {
  wait_core(CORE_GENERAL);
  cop2_run( );
  signal_core(CORE_DMA1);
 }
// control the operation of DMA1
 if (core_id == CORE_DMA1) {
  wait_core(CORE_COP2);
  dma1_run( );
  signal_core(CORE_DMA0);
 }
}
```

In the technical solution of some embodiments of the present disclosure, the acquisition, storage and application of user's personal information involved are all in compliance with the provisions of relevant laws and regulations, and do not violate public order and good customs.

According to an embodiment of the present disclosure, the present disclosure further provides an electronic device, a readable storage medium, and a computer program product.

Figure 6:
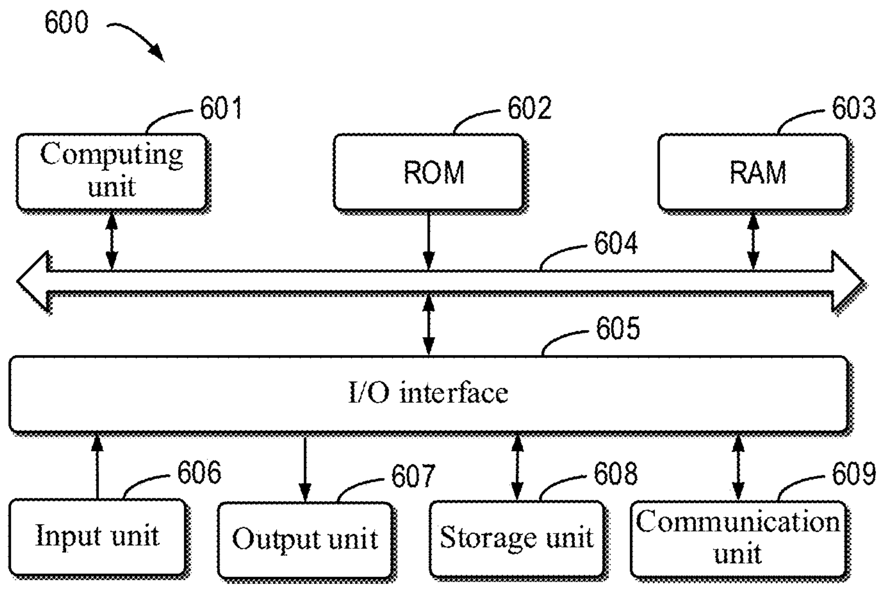
FIG. 6 shows a block diagram of a device 600 capable of implementing multiple embodiments of the present disclosure.

FIG. 6 shows a schematic block diagram of an exemplary electronic device 600 that can be used to implement the embodiments of the present disclosure. The electronic device 600 may be a computing device including a heterogeneous multi-core processor. The electronic device is intended to represent various forms of digital computers, such as a laptop, a desktop, a worktable, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components shown herein, their connections and relationships, and their functions are by way of example only, and are not intended to limit implementations of the present disclosure described and/or claimed herein.

As shown in FIG. 6, the device 600 includes a computation unit 601, which may be heterogeneous multi-core processors, and may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computation unit 601, the ROM 602 and the RAM 603 are connected to each other through a bus 604. An input/output (I/O) interface 605 is also connected to the bus 604.

The following components in the device 600 are connected to the I/O interface 605: an input unit 606, for example, a keyboard and a mouse; an output unit 607, for example, various types of displays and a speaker; a storage device 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computation unit 601 may be various general-purpose and/or special-purpose accelerating assemblies having processing and computing capabilities. Some examples of the computation unit 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 601 performs the various methods and processes described above, for example, the method 400 and 500. For example, in some embodiments, the method 400 and 500 may be implemented as a computer software program, which is tangibly included in a machine readable medium, for example, the storage device 608. In some embodiments, part or all of the computer program may be loaded into and/or installed on the device 600 via the ROM 602 and/or the communication unit 609. When the computer program is loaded into the RAM 603 and executed by the computation unit 601, one or more steps of the above method 400 and 500 may be performed. Alternatively, in other embodiments, the computation unit 601 may be configured to perform the method 400 and 500 through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a standalone software package and partly on a remote machine, or entirely on the remote machine or a server.

In the context of some embodiments of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for processing a computing task by a heterogeneous multi-core processor, the heterogeneous multi-core processor comprising a general-purpose processing core and a dedicated acceleration core, the method comprising:

for a predetermined type of computing task, allocating a plurality of instruction blocks in the computing task to the general-purpose processing core and the dedicated acceleration core;

transferring, by a control unit in the dedicated acceleration core, an instruction completion indication of a predetermined co-processing unit coupled thereto to at least one processing unit of the general-purpose processing core through a signal path, the signal path being configured to couple the at least one general-purpose processing unit to the control unit; and in response to determining that the instruction completion indication is received, acquiring, by the general-purpose processing core, data from a first on-chip cache inside the dedicated acceleration core through a data path for completing the computing task, the data path being configured to couple the general-purpose processing core to the first on-chip cache, wherein the data path is a bus directly coupling a routing structure component to the first on-chip cache without coupling any other cache, and the routing structure component is only provided in the general-purpose processing core and is coupled directly to the at least one processing unit of the general-purpose processing core;

wherein said acquiring of the data comprises:

sending an access address for the data to the routing structure component;

determining, by the routing structure component, to access a second on-chip cache inside the general-purpose processing core or the first on-chip cache based on the access address; and in response to determining to access the first on-chip cache, acquiring the data from the access address in the first on-chip cache via the data path.

2. The method according to claim 1, wherein allocating the plurality of instruction blocks in the computing task to the general-purpose processing core and the dedicated acceleration core comprises:

allocating the plurality of instruction blocks to the general-purpose processing core and the dedicated acceleration core based on core identifiers.

3. The method according to claim 1, wherein transferring the instruction completion indication to the general-purpose processing core comprises:

copying the instruction completion indication by a summarization and distribution component in the general-purpose processing core for sending to the at least one general-purpose processing unit.

4. The method according to claim 1, further comprising:

in response to that the at least one general-purpose processing unit completes an instruction block operation, sending an instruction completion indication to a summarization and distribution component; and summarizing the instruction completion indication by the summarization and distribution component for sending to the predetermined co-processing unit.

5. A heterogeneous multi-core processor, comprising:

a dedicated acceleration core, comprising a first on-chip cache inside the dedicated acceleration core and a control unit coupled to the first on-chip cache;

a general-purpose processing core, comprising a routing structure component and at least one general-purpose processing unit coupled to the routing structure component;

a data path, comprising a bus configured to directly couple the routing structure component to the first on-chip cache so that the at least one general-purpose processing unit can access the first on-chip cache without passing through any other cache, wherein the routing structure component is only provided in the general-purpose processing core; and a signal path, configured to couple the at least one general-purpose processing unit to the control unit for transferring an instruction completion indication related to the access;

the general-purpose processing core further comprising: a second on-chip cache inside the general-purpose processing core, coupled to the routing structure component, the routing structure component being configured to access the first on-chip cache via the data path or the second on-chip cache based on received address information.

6. The processor according to claim 5, the general-purpose processing core further comprising:

a summarization and distribution component, configured to summarize instruction completion indications received from the at least one general-purpose processing unit for sending to the control unit, or to distribute an instruction completion indication received from a predetermined co-processing unit to the at least one general-purpose processing unit.

7. The processor according to claim 5, the dedicated acceleration core further comprising:

at least one co-processing unit; and at least one direct memory access unit.

8. The processor according to claim 5, further comprising:

a scheduler, configured to:

obtain a computing task to be processed;

in response to determining that the type of the computing task is a predetermined type, determine a core group comprising an available dedicated acceleration core and an available general-purpose processing core;

configure a working mode of the cores in the core group to a predetermined mode; and allocate a plurality of instruction blocks of the computing task to the available dedicated acceleration core and the available general-purpose processing core for processing the computing task.

9. The processor according to claim 8, wherein the available general-purpose processing core is configured to:

wait for an instruction completion signal from a predetermined co-processing unit in the dedicated acceleration core; and in response to receiving the instruction completion signal from the predetermined co-processing unit, execute the instruction blocks assigned to the general-purpose processing core.

10. The processor according to claim 9, wherein the general-purpose processing core is further configured to:

in response to determining that the execution of the instruction blocks in the general-purpose processing core is completed, send an instruction completion signal to a target co-processing unit in the dedicated acceleration core.

11. The processor according to claim 8, wherein the dedicated acceleration core is configured to:

in response to determining that the execution of the instruction blocks in a co-processing unit is completed, send an instruction completion indication to the general-purpose processing core; and receive an instruction completion indication from the general-purpose processing core, the instruction completion indication comprising to which co-processing cores in the dedicated acceleration core the instruction completion indication is sent.

12. An electronic device, comprising:

at least one heterogeneous multi-core processor; and a memory connected to the at least one heterogeneous multi-core processor, wherein the memory stores one or more computer instructions executable by the at least one heterogeneous multi-core processor, wherein the one or more computer instructions, when executed by the at least one heterogeneous multi-core processor, cause the electronic device to perform operations for processing a computing task by the at least one heterogeneous multi-core processor, the at least one heterogeneous multi-core processor comprising a general-purpose processing core and a dedicated acceleration core, and the operations comprising:

for a predetermined type of computing task, allocating a plurality of instruction blocks in the computing task to the general-purpose processing core and the dedicated acceleration core;

transferring, by a control unit in the dedicated acceleration core, an instruction completion indication of a predetermined co-processing unit coupled thereto to at least one processing unit of the general-purpose processing core through a signal path, the signal path being configured to couple the at least one general-purpose processing unit to the control unit; and in response to determining that the instruction completion indication is received, acquiring, by the general-purpose processing core, data from a first on-chip cache inside the dedicated acceleration core through a data path for completing the computing task, the data path being configured to couple the general-purpose processing core to the first on-chip cache, wherein the data path is a bus directly coupling a routing structure component to the first on-chip cache without coupling any other cache, and the routing structure component is only provided in the general-purpose processing core and is coupled directly to the at least one processing unit of the general-purpose processing core;

wherein acquiring the data comprises:

sending an access address for the data to the routing structure component;

determining, by the routing structure component, to access a second on-chip cache inside the general-purpose processing core or the first on-chip cache based on the access address; and in response to determining to access the first on-chip cache, acquiring the data from the access address in the first on-chip cache via the data path.

13. The device according to claim 12, wherein allocating the plurality of instruction blocks in the computing task to the general-purpose processing core and the dedicated acceleration core comprises:

allocating the plurality of instruction blocks to the general-purpose processing core and the dedicated acceleration core based on core identifiers.

14. The device according to claim 12, wherein transferring the instruction completion indication to the general-purpose processing core comprises:

copying the instruction completion indication by a summarization and distribution component in the general-purpose processing core for sending to the at least one general-purpose processing unit.

15. The device according to claim 12, the operations further comprising:

in response to that the at least one general-purpose processing unit completes an instruction block operation, sending an instruction completion indication to a summarization and distribution component; and summarizing the instruction completion indication by the summarization and distribution component for sending to the predetermined co-processing unit.

16. The processor according to claim 5, wherein the general-purpose processing core is configured for use as a co-processing unit of the dedicated acceleration core, and data is configured to be obtained from the general-purpose processing core when configured as a co-processing unit to co-processing unit(s) in the dedicated acceleration core through a path which consists of the routing structure component, the data path and the first on-chip cache.

17. The method according to claim 1, the heterogeneous multi-core processor further comprising:

one or more on-chip caches, which are located other than in the general-purpose processing core and the dedicated acceleration core; and an on-chip interconnect structure, which couples each of the one or more on-chip caches to the general-purpose processing core, the dedicated acceleration core, and a scheduling controller;

wherein the on-chip interconnect structure and the data path are physically separate paths over which data can flow; and wherein the data path does not couple the scheduling controller.

18. The method according to claim 1, wherein the signal path comprises a direct signal path which is a physical bus, and which is configured to couple the at least one processing unit of the general-purpose processing core to the control unit in the dedicated acceleration core;

wherein the direct signal path bypasses a scheduling controller of the heterogeneous multi-core processor; and wherein the control unit is provided in the dedicated acceleration core and is not provided in the general-purpose processing core.

19. The method according to claim 18, wherein in response to determining that the instruction completion indication is received further comprises, determining, by the at least one processing unit of the general-purpose processing core;

wherein the data path is a bus directly coupling a routing structure component to the first on-chip cache without coupling any other cache is a physical data path which bypasses any other on-chip caches comprised in the heterogeneous multi-core processor and off-chip caches; and wherein the at least one processing unit of the general-purpose processing core is configured to, upon determining by the at least one processing unit to execute a wait instruction from its instruction stream, pause execution until the instruction completion indication is received via the signal path.

* * * * *